(12) United States Patent
Ding

(10) Patent No.: US 7,739,367 B2
(45) Date of Patent: Jun. 15, 2010

(54) MANAGING NETWORK-ENABLED DEVICES

(75) Inventor: Yi Ding, Saratoga, CA (US)

(73) Assignee: Ricoh Company, Ltd., Tokyo (JP)

( * ) Notice: Subject to any disclaimer, the term of this patent is extended or adjusted under 35 U.S.C. 154(b) by 821 days.

(21) Appl. No.: 11/332,550

(22) Filed: Jan. 12, 2006

(65) Prior Publication Data
US 2007/0162567 A1 Jul. 12, 2007

(51) Int. Cl.
G06F 15/16 (2006.01)
(52) U.S. Cl. .................. 709/223; 709/208; 709/224; 709/246; 370/252; 370/254
(58) Field of Classification Search .......... 709/200, 709/202, 203, 211, 220, 223, 226, 315, 208, 709/221, 227, 230, 320, 246; 370/401, 463; 717/6, 11
See application file for complete search history.

(56) References Cited

U.S. PATENT DOCUMENTS

| | | | |
|---|---|---|---|
| 6,226,788 B1 * | 5/2001 | Schoening et al. | 717/107 |
| 6,381,321 B1 * | 4/2002 | Brown et al. | 379/207.02 |
| 6,470,384 B1 | 10/2002 | O'Brien | |
| 7,302,476 B1 * | 11/2007 | Howarth et al. | 709/220 |
| 7,325,057 B2 * | 1/2008 | Cho et al. | 709/224 |
| 2002/0052966 A1 * | 5/2002 | Isomura et al. | 709/230 |
| 2002/0083143 A1 * | 6/2002 | Cheng | 709/208 |
| 2002/0107905 A1 * | 8/2002 | Roe et al. | 709/202 |
| 2002/0112058 A1 * | 8/2002 | Weisman et al. | 709/227 |
| 2002/0133581 A1 * | 9/2002 | Schwartz et al. | 709/223 |
| 2003/0005099 A1 * | 1/2003 | Sven et al. | 709/223 |
| 2003/0061279 A1 * | 3/2003 | Llewellyn et al. | 709/203 |
| 2003/0069949 A1 * | 4/2003 | Chan et al. | 709/221 |
| 2003/0088651 A1 * | 5/2003 | Wilson, Jr. | 709/221 |

(Continued)

FOREIGN PATENT DOCUMENTS

KR 2007001437 A * 6/2005

OTHER PUBLICATIONS

Ichiro Satoh, "A Location Model for Pervasive Computing Environments", 2005, IEEE Computer Society, pp. 1-10.*

(Continued)

*Primary Examiner*—Wing F Chan
*Assistant Examiner*—Michael Martinez
(74) *Attorney, Agent, or Firm*—Hickman Palermo Truong & Becker LLP; Daniel D. Ledesma

(57) ABSTRACT

A technique is provided for dynamically extending a network device manager when a new device and/or service are added to a network. A technique for extending a rule set associated with the management system is also provided. A service discovery module discovers a new network device on a network. A service operation module (SOM) is generated for the network device. The SOM provides an interface for a management module (MM) to communicate with the network device. The SOM provides data, corresponding to the service provided by the network device, to the MM. When a client sends the MM a request for a service provided by the network device, the MM provides the service request to the SOM which forwards the request to the network device. Users of the network device manager may define rules for a network device after the network device is added to the network, wherein the MM issues a service request of a network device in response to receiving an event notification.

16 Claims, 5 Drawing Sheets

U.S. PATENT DOCUMENTS

| | | | |
|---|---|---|---|
| 2003/0231602 A1 | 12/2003 | Slemmer | |
| 2004/0205172 A1 | 10/2004 | Doheon | |
| 2004/0208195 A1* | 10/2004 | Kim et al. | 370/463 |
| 2004/0255302 A1* | 12/2004 | Trossen | 719/318 |
| 2005/0267928 A1* | 12/2005 | Anderson et al. | 709/200 |
| 2006/0094360 A1* | 5/2006 | Jung et al. | 455/41.2 |
| 2006/0184661 A1* | 8/2006 | Weisman et al. | 709/224 |
| 2007/0027970 A1* | 2/2007 | Backman et al. | 709/223 |
| 2007/0118629 A1* | 5/2007 | Kerdraon et al. | 709/223 |
| 2008/0205419 A1* | 8/2008 | Shin et al. | 370/401 |

OTHER PUBLICATIONS

Chih-Lin Hu, Yen-Ju Huang and Wei-Shun Liao, "Multicast Complement for Efficient UPnP Eventing in Home Computing Network," Proceedings of the 2007 IEEE Conference on Portable Information Devices (IEEE Portable '07), Orlando, FL, USA, Mar. 25-29, 2007. [NOTE: Partial Result/CIC-06 's].*

Beatty, J. et al., Web Services Dynamic Discovery (WS-Discovery) *Microsoft Corporation, Inc.* (2004-2005) pp. 1-42.

Box, D. et al., "Web Services Eventing (WS-Eventing)" *BEA System, Inc., Computer Associates International Inc., International Business Machines Corporation, Microsoft Corporation, Inc., Sun Microsystems, Inc. and TIBCO Software Inc.* (2004) 38 pages.

EPO Communication from corresponding Application No. 07250129.9-2413, 6 pages.

"Understanding Universal Plug and Play" A White Paper. Internet Citation, Jun. 2000, XP002370921, retrieved from the Internet: <URL:http://www.upnp.org/download/ UPNP_UnderstandingUPNP.doc>, 44 pages.

"Universal Plug and Play Device Architecture" Internet Citation, Jun. 2000, XP002210614, retrieved from the Internet: <URL: http://www.upnp.org>, 86 pages.

Communication from European Patent Office dated Sep. 20, 2007 received in corresponding Application No. 07250129.9-2413.

* cited by examiner

CLASS DIAGRAM 300

MANAGING NETWORK-ENABLED DEVICES

FIELD OF THE INVENTION

The present invention relates to managing network devices, and more particularly to dynamically extending a management system when a new service or device is added to the system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Various devices are increasingly becoming network-enabled. It is possible to have home appliances networked in such a way that a network management device may be used to correlate the services provided by the home appliances. Network-enabled devices, such as printers and computers, are more common in the business setting. For example, a network management device may be pre-configured to receive and process a notification from a printer when the printer runs out of paper and/or ink. Upon receiving the notification, the network management device will notify (e.g., email, instant message) one or more users of the network so that the problem can be quickly resolved.

However, in current device management systems, whenever a new device or new service provided by an existing device is added to the network, it is necessary to modify code pertaining to the entire management system in order to support the new device or service. Thus, current network management systems are not extendable without rewriting the device management code. Furthermore, the management and correlation of services provided by various network devices in existing network management systems are pre-defined and, thus, also not easily extendable. Extending the network with new devices, services, and rules thus requires time and a significant expense to pay someone with knowledge of programming the specific network device manager.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Table of Contents

I. OVERVIEW
II. SERVICE DISCOVERY MODULE
III. SERVICE OPERATION MODULE
IV. MANAGEMENT MODULE
V. EVENT HANDLER MODULE
VI. NETWORK EXAMPLE
VII. IMPLEMENTATION MECHANISMS

I. Overview

A technique for managing network devices in a network is provided where, upon the discovery of new network devices and new services provided by network devices, a device manager is extended without the need to modify the device manager code in order to support the newly discovered devices and services.

Figure 1:
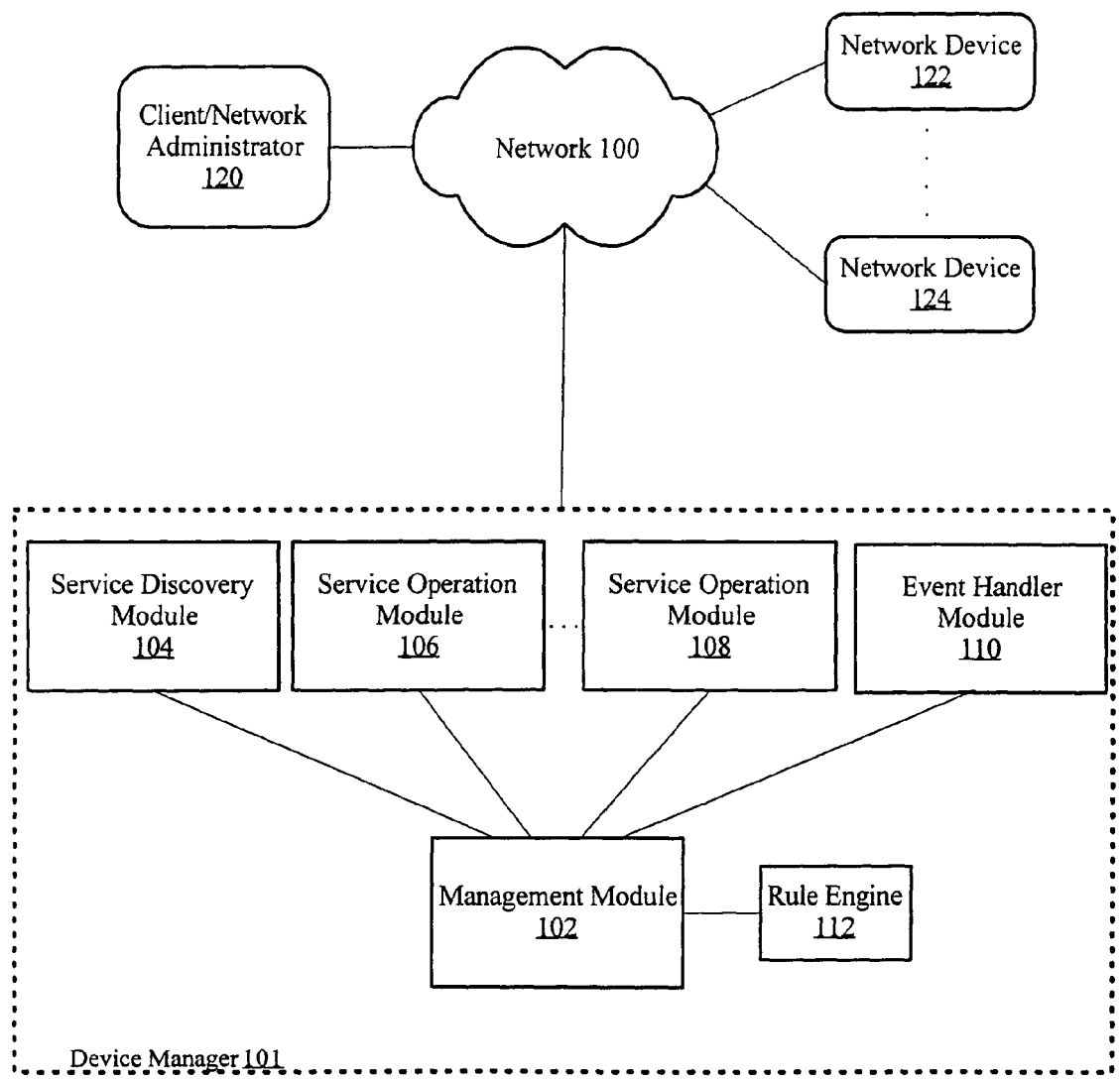
FIG. 1 is a block diagram illustrating various components of a network device manager, according to an embodiment of the invention.

FIG. 1 is a block diagram illustrating various components of a device manager 101 in a network 100, according to an embodiment of the invention. Network 100 may be implemented by any medium or mechanism that provides for the exchange of data between various nodes in the network. Examples of network 100 include, without limitation, a network such as a Local Area Network (LAN), Wide Area Network (WAN), Ethernet or the Internet, or one or more terrestrial, satellite or wireless links. Network 100 may include a combination of networks such as those described. Network 100 may transmit data according to Transmission Control Protocol (TCP) and Internet Protocol (IP).

Network 100 may be a home network comprised of computers, home appliances, and various communication devices (e.g., cell phone, PDA). Network 100 may also be a business network comprised of printers, computers, scanners, PDAs, telephones, and so forth—any device that can be networked and used for business purposes.

A device manager 101 provides a client 120, such as a network administrator, with the ability to discover and connect with new devices 122-124, submit requests for services from devices 122-124, and submit rules. Device manager 101 may notify client 120, and/or may request services from devices 122-124, upon detecting network events, e.g., via an event handler module 110.

A service operation module (SOM) 106 is generated for network device 122 when device 122 is discovered on the network. A service discovery module (SDM) 104 may be used to discover the new devices. SOM 106 acts as an interface between a management module (MM) 102 and network device 122. When MM 102 is notified of a new network device 122, e.g., via SDM 104, MM 102 may request the services (and operations associated with the services) provided by the new network device and the events associated with the new network device. The request is sent to SOM 106 and then forwarded to network device 122.

Client 120 may request services from network devices 122-124. The service request is sent to MM 102, which forwards the requests to the appropriate SOM, which forwards the request to the corresponding network device. Client 120 may also request to be notified of network events from network device 122, via MM 102 and event handler 110, associated with the network device. Based on events and operations supported by network devices, a user may specify rules where MM 102 will initiate a specified action to be performed by a network device when MM 102 receives a notification of a specified event from the same network device, or a different network device, e.g., via the event handler module (EHM) 110. Therefore, a network user may define multiple rules to correlate the use of various services to accomplish one or more tasks.

II. Service Discovery Module

As part of the management system, the primary purpose of service discovery module (SDM) 104 is to discover new devices and new services that are added to network 100, as well as existing devices and services that change. For example, if the address of device that was previously discovered changes, then the device is discovered again with the new address. Also, if the metadata associated with an existing service is modified in some way, the modified service will be discovered.

SDM 104 may be implemented as a separate module from management module (MM) 102 or may be part of same logic as MM 102. Any technique or approach may used to discover new devices. For example, SDM 104 may periodically poll the network for new devices and new services provided by existing devices, or a new network device may be configured to notify SDM 104, or MM 102, directly of its existence. As another example, current device and service discovery techniques that may be used include Web Services Discovery (WSD) and Universal Plug and Play (UPnP). Also, the metadata corresponding to each device and service may also be retrieved using Web Services Metadata Exchange, which retrieves three types of metadata: WS-Policy, WSDL, and XML Schema. Embodiments of the invention may use, but are not limited to, any of the above discovery and metadata exchange mechanisms.

If MM 102 and SDM 104 are logically different modules, the interface between MM 102 and SDM 104 includes the following function calls, according to one embodiment of the invention.

| NAME | PARAMETERS | RETURNS | COMMENTS |
| --- | --- | --- | --- |
| SaveDeviceInfo | Address, ServiceID, ServiceType, eventName list. | Success/Fail | SDM may also store the service information. |

When SDM 104 discovers a device or service, SDM 104 will notify MM 102 by sending the network address of the device (Address), a unique service/device identifier (ServiceID), the type of service/device discovered (ServiceType), and a list of events (eventName list) associated with the new service or device. Depending on whether information pertaining to the service/device was properly received, MM 102 may indicate to SDM 104 a success or failure indication.

III. Service Operation Module

The service operation module (SOM) allows device manager 101 to be easily extendable. Every service is associated with its own SOM. A SOM provides an interface allowing MM 102 to communicate with a network device. An example of the interface between a SOM and MM 102 is described in the table below, according to one embodiment.

| NAME | PARAMETERS | RETURNS | COMMENTS |
| --- | --- | --- | --- |
| RegisterNewDevice | Address, ServiceID | | SOM → MM; Register with MM that a new SOM is added to the network. |
| GetOperations | | List of operations with corresponding parameters | MM → SOM; Query to get all the operations the service supports. |
| SendOperation | Operation name with corresponding parameters | True/False | MM → SOM; Send an operation (e.g., in response to the triggering of a rule). |

Figure 2:
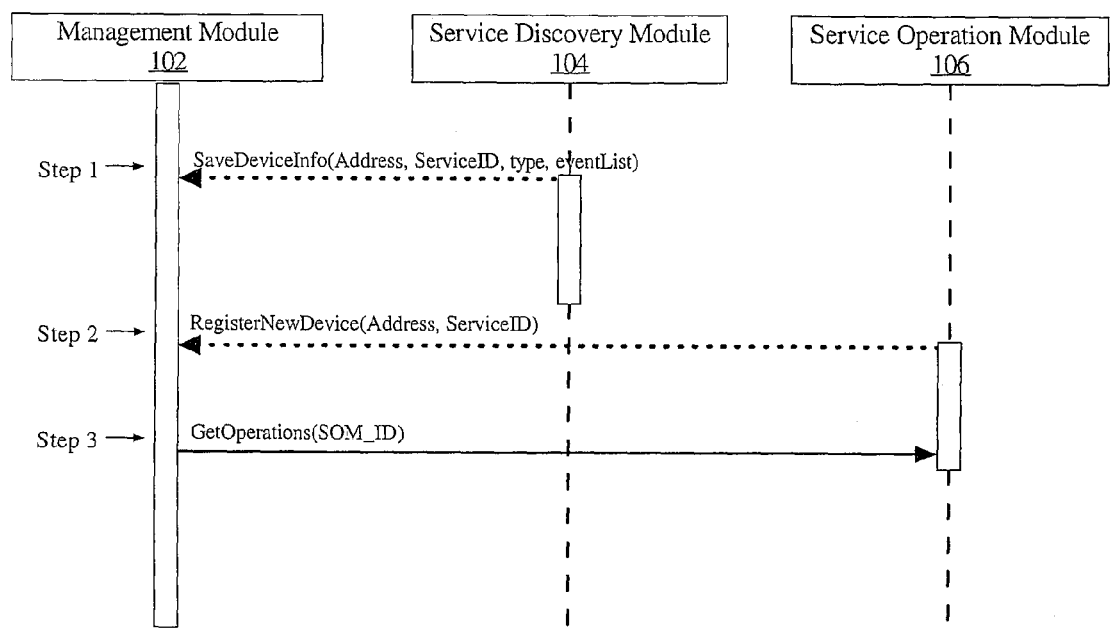
FIG. 2 is a sequence diagram illustrating the communications between modules in a device manager when a service is discovered, according to an embodiment of the invention.

FIG. 2 is a sequence diagram illustrating the communications between modules in a device manager when a service is discovered, according to an embodiment of the invention. In step 1 of FIG. 2, SDM 104 discovers a new device (e.g., device 122) in network 100 and provides MM 102 with information pertaining to the services provided by the new device. In step 2, a SOM associated with the new device registers with MM 102 by sending MM 102 the network address (Address) of the new service associated with the device.

In step 3, MM 102 sends a request to the SOM to acquire the operations supported by the new device. In response to this request, the SOM returns a list of operations with their respective parameters so that an end user may define new rules that specify one or more operations to be issued upon the occurrence of a network event.

When a network event occurs, and a rule is associated with the event, a rules engine, which may or may not be logically part of MM 102, sends the appropriate SOM an operation (i.e., SendOperation) specified in the rule. The function call includes the name of the operation and a list of parameters required by the operation. The SOM then forwards the operation to the network device associated with the SOM.

IV. Management Module

Management module (MM) 102 may be implemented on any device, such as a home computer or a handheld device, that can be networked. An important feature of MM 102 is that MM 102 "knows" how to communicate with the other modules (e.g., SDM, SOMs, event handler) and with an end user, such as a network administrator. MM 102 and other modules may be distributed or implemented on a single platform.

According to one embodiment, the interface between an end user, e.g., client 120, and MM 102 is described in the table below.

| NAME | PARAMETERS | RETURNS | COMMENTS |
| --- | --- | --- | --- |
| GetServices | | List of one or more services with accompanying address, ServiceID, and service type. | Get all services discovered. |
| GetEvents | ServiceID | List of EventNames | Get event list of a particular service. |
| GetOperations | ServiceID | List of operations with parameters. | Get operation list of a particular service. |
| SetEvent | ServiceID, EventName, Duration | EventID | Subscribe an event. |
| SetOperation | ServiceID, OperationName, parameters specific to the operation | OperationID | Specify an operation with corresponding parameters to save for later use when certain conditions are met. |
| SetRule | An expression statement with EventID and OperationID | | Specify a rule with EventIDs and OperationIDs. |

By issuing the GetServices function call, client 120 gets a list of services that MM 102 has discovered (e.g., via SDM 104) with each service's corresponding network address, service identifier, and service type. GetEvents causes MM 102 to send client 120 a list of events associated with a particular service. Client 120 may provide a service identifier that uniquely identifies the particular service on the network and/or the network address of the device providing the particular service. GetOperations returns to client 120 a list of operations with their respective parameters. Again, client 120 may provide the service identifier of the particular service that supports the list of operations. According to one embodiment, when client 120 issues GetServices, the function call also returns the events and operations supported by the device(s), as described above.

The SetEvent function call allows client 120 to subscribe to (i.e., register interest with) an event supported by a particular service. The SetEvent function registers the event with MM 102. MM 102 subsequently forwards the request to EHM 110 via a SubscribeEvent function (described in more detail below). With this function call, an event handler module (EHM) 110 (either logically part of MM 102 or logically separate therefrom) may subsequently monitor the particular service and notify MM 102 and/or client 120 of the event. EHM 110 may also, upon notification of the event, initiate a function call to a rules engine (e.g., rules engine 112) which will initiate an operation based on a rule defined by the system or by client 120.

The parameters to SetEvent may include the service identifier of the particular service, the name of the particular event (obtained as a result of the GetEvents function call), and duration. Duration refers to how long device manager 101 via EHM 110 will monitor for the particular event. For instance, an administrator at client 120 may be interested in the particular event for two hours. Thus, SetEvent will have a duration parameter that specifies two hours, after which EHM 110 may cease monitoring for the event or reporting the event to MM 102. In response to the SetEvent function, MM 102 sends client 120 an event identifier uniquely identifying the event, which may be used in defining new rules for network 100.

SetOperation allows client 120 to specify an operation with certain parameters for later use when certain conditions are met, such as the triggering of a rule based on the occurrence of an event. The SetOperation function call includes the service identifier as parameters and the name of the operation and parameters specific to the operation. In return, MM 102 sends client 120 an operation identifier uniquely identifying the operation, which also may be used in defining new rules for network 100.

The SetRule function call provides client 120 a means to specify an expression statement to MM 102 or rules engine 112, indicating a particular operation or operations to perform when a network event(s) occurs. Rule engine 112 (which may or may not be logically part of MM 102) evaluates the rule specified. The interface between MM 102 and client 120 provides the ability to efficiently extend the rules engine to handle new rules.

Figure 3:
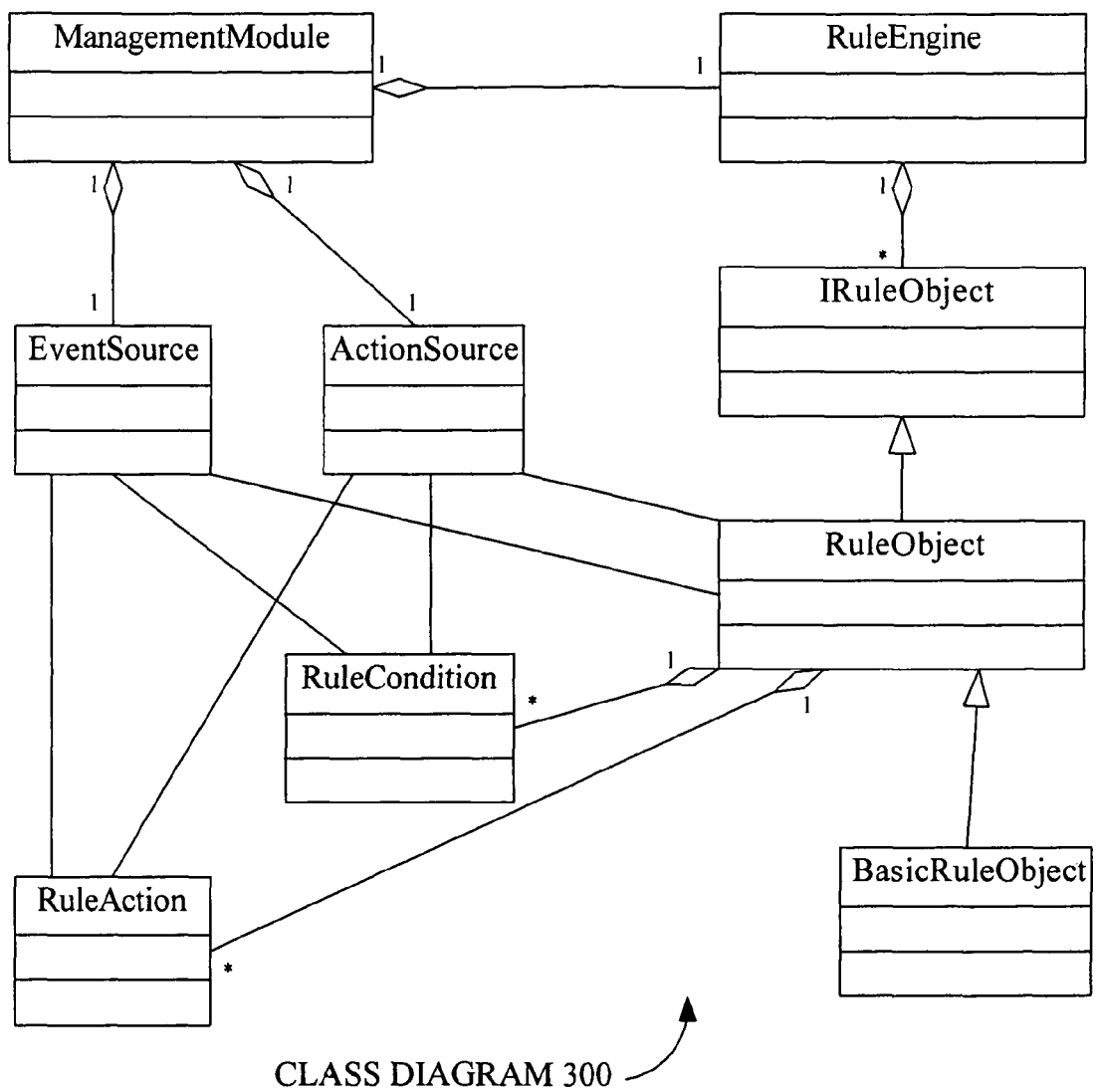
FIG. 3 is a class diagram illustrating the relationships between a management module and rule-related classes, according to an embodiment of the invention.

FIG. 3 is a class diagram illustrating the relationships between MM 102 and rule-related classes, according to an embodiment of the invention. Class diagram 300 provides an overview of a management module by showing different classes associated with the management module class and the relationships among them. UML class notation is a rectangle divided into three parts: class name, attributes, and operations. Names of abstract classes, such as IRuleObject, are in italics. Relationships between classes are the connecting links.

Class diagram 300 has at least three kinds of relationships: association, aggregation, and generalization. Association is a relationship between instances of the two classes connected by a link. An association exists between two classes if an instance of one class must know about the other in order to perform its work. Aggregation is an association in which one class belongs to a collection. An aggregation has a diamond end pointing to the part containing the whole. Thus, in class diagram 300, the ManagementModule class has a collection of an EventSource, ActionsSource, and RuleEngine objects. The RuleEngine class has a collection of IRuleObjects, and the RuleObject class has a collection of RuleCondition and RuleAction objects.

A generalization is an inheritance link indicating one class is a superclass of the other class. A generalization has a triangle pointing to the superclass. Thus, in class diagram 300, IRuleObject is a superclass of RuleObject and RuleObject is a superclass of BasicRuleObject.

The multiplicity of an association end is the number of possible instances of the class associated with a single instance of the other end. Multiplicities are single numbers or ranges of numbers. As class diagram 300 illustrates, there can be only one ManagementModule for each RuleEngine and vice versa. The same multiplicity exists between ManagementModule and EventSouce and between ManagementModule and ActionSource. Also, there can be only one RuleEngine for each IRuleObject but a RuleEngine may have any number of IRuleObjects. Additionally, there can be only one RuleObject for each RuleCondition but a RuleObject may have multiple RuleConditions. The same multiplicity exists between RuleObject and RuleAction.

V. Event Handler Module

Similar to SDM 104 and SOMs 106-108, event handler module (EHM) 110 may communicate directly with network devices 122-124. Communication may be performed using various techniques, such as WS-Eventing which defines a baseline set of operations that allow Web services to provide asynchronous notifications to interested parties. WS-Eventing defines a simple level of Web services interfaces for notification producers (e.g., device 122) and notification consumers (e.g., EHM 110) including standard message exchanges. The interface between EHM 110 and MM 102 may be comprised of the function calls SubscribeEvent and SaveNotification, described in the table below, according to one embodiment.

| NAME | PARAMETERS | RETURNS | COMMENTS |
| --- | --- | --- | --- |
| SubscribeEvent | Address, ServiceID, EventName, Duration | EventID | MM → EHM; Send subscription information to subscribe the event. |
| SaveNotification | EventSource, EventName, NotificationMsg, time | | EHM → MM; Store Event notification information. |

After MM 102 receives a SetEvent request from client 120, MM 102 subsequently forwards the request to EHM 110 via a SubscribeEvent function call with the accompanying network address, service identifier, event name information, and a duration value. If the request is sent properly, EHM 110 may return an event identifier (EventID) to MM 102 that may be returned to client 120.

Upon the occurrence of an event supported by a particular service, EHM 110 receives a message from the particular service that includes parameters such as the source of the event (EventSource), the name of the event (EventName), the notification (NotificationMsg), and time the event occurred. EHM 110 parses this message from the particular service and sends the parameters, via a SaveNotification function call, to MM 102. MM 102 will store the function call and may notify the rule engine immediately of the event or events that occurred, which may result in one or more operations being triggered based on a rule.

VI. Network Example

Figure 4:
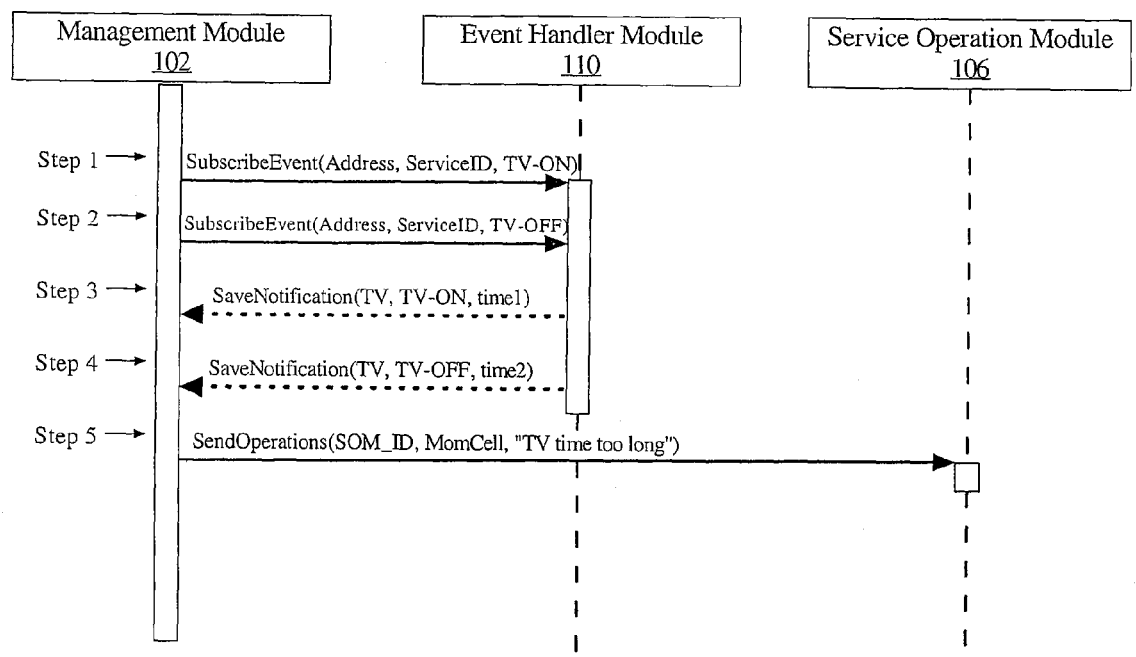
FIG. 4 is a sequence diagram illustrating the communications between modules when a rule is defined and the rule is executed, according to an embodiment of the invention.

FIG. 4 is a sequence diagram illustrating the communications between modules when a rule is defined and the rule is executed, according to an embodiment of the invention. In this example, network 100 is a home-based network, device 122 is a cell phone, newly added device 124 is a networked television, and client 120 is a home computer for managing the devices. The user of network 100 is a parent monitoring how much time his/her child spends watching television. After 1) SDM 104 discovers the television on network 100, 2) SOM 108 is generated and added to network 100, and 3) SOM 108 registers with MM 102, the parent gets the events and operations supported by the television. The parent issues a rule using the event and operation identifiers from the SetEvent and SetOperation function calls. The rule is triggered when the television has been on for two hours in a day. In response to EHM 110 detecting two hours of television time, the parent's cell phone (i.e., device 122) is called to notify the parent of this occurrence.

In step 1, MM 102 sends a SubscribeEvent request to EHM 110 in response to a SetEvent function call issued by the parent. The request includes the address and service identifier of the television in the network. The name of the event is TV-ON. In step 2, MM 102 sends another SubscribeEvent request to EHM 110 in response to another SetEvent function call by the parent. This request also includes the address and service identifier of the television in the network. The name of this event is TV-OFF.

At some point in time after the SubscribeEvent function calls, EHM 110 detects a network event—the television has been turned on. In response, at step 3, EHM 110 sends a message to MM 102 indicating that the source of the event is the television, the name of the event is TV-ON, and the time of this event was time1. Later, EHM 110 detects that the television has been turned off: another network event. In response, at step 4, EHM 110 sends another message to MM 102 indicating that the source of the event is the television, the name of the event name is TV-OFF, and the time of the event was time2.

If the difference between time1 and time2 is two hours, then the function call at step 5 is issued by MM 102 to SOM 106, which is the SOM for the cell phone (i.e., device 122). The function call, SendOperation, includes the SOM_ID for SOM 106 and the parameters of the operation. Here, the name of the device is provided along with a message ("TV time too long") to be sent to the parent. The parent is subsequently notified by the cell phone with the message according to the rule the parent configured.

VII. Implementation Mechanisms

Figure 5:
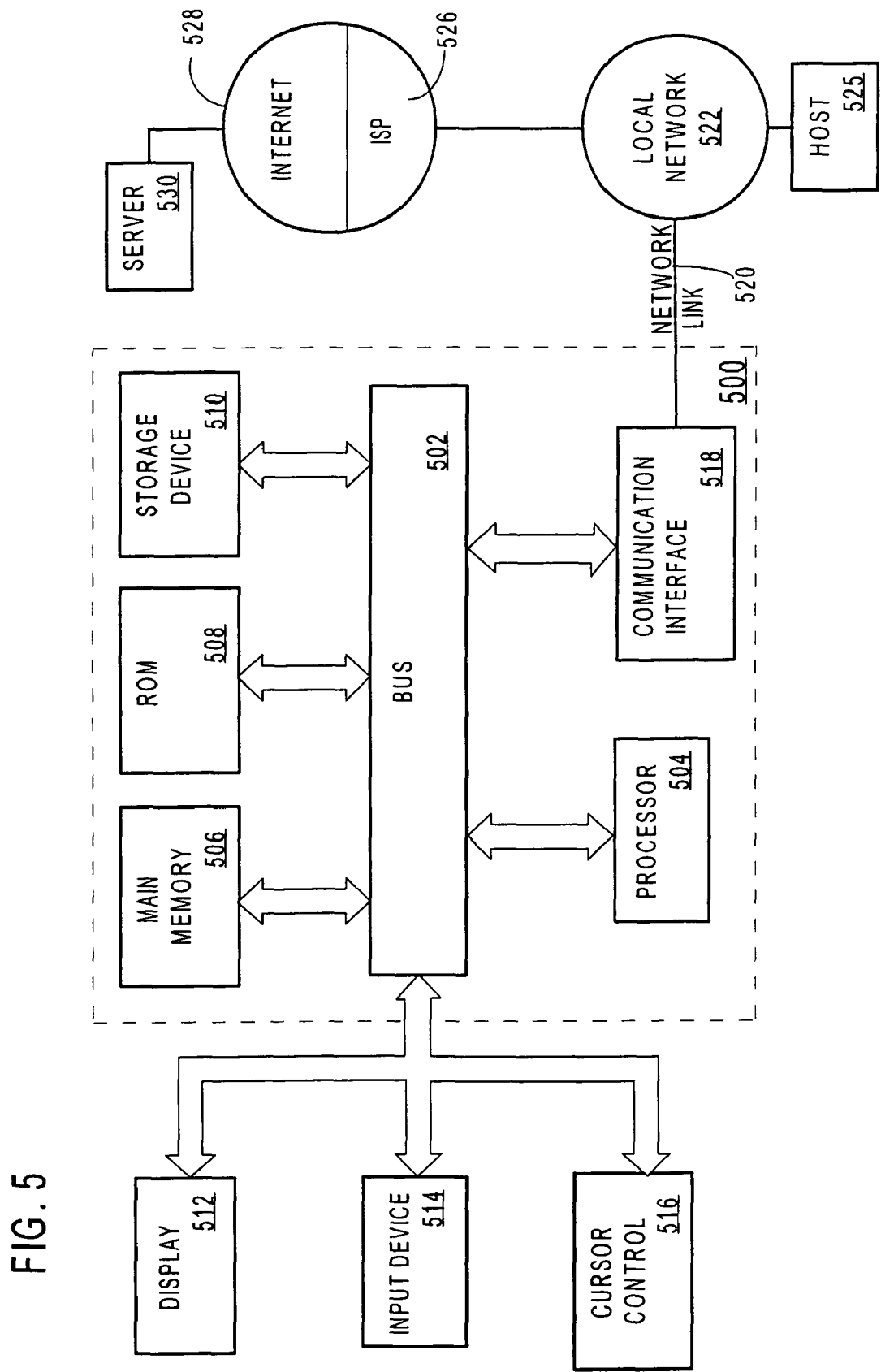
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for managing multiple services, comprising:

generating a first service operation module for a first service provided by a first network device, wherein the first service operation module (a) supports a set of functions that are invokable by a management module and (b) acts as an interface between the management module and the first service provided by the first network device;

in response to the management module invoking, with respect to the first service operation module, a first function of the set of functions, the first service operation module for the first service providing, to the management module that is separate from the first service operation module, first operation data that specifies one or more first operations that the first service is configured to perform;

the management module receiving, from a client, a request for a first operation that one of the multiple services is configured to perform;

in response to the management module receiving the request from the client, the management module determining, based upon the first operation data, whether the first service is configured to perform the first operation specified in the request;

in response to the management module determining that the first service is configured to perform the first operation specified in the request, the management module invoking a second function of the set of functions to provide, to the first service operation module, the request for the first operation;

in response to the first service operation module receiving the request, the first service operation module sending the first operation to the first service;

discovering a second service that is different than the first service;

after discovering the second service:
generating a second service operation module for the second service, wherein the second service operation module is different than the first service operation module and is separate from the management module, wherein the second service operation module (c) supports the set of functions that are invokable by the management module and (d) acts as an interface between the management module and the second service, and registering the second service module with the management module;

in response to the management module invoking, with respect to the second service operation module, the first function of the set of functions, the second service operation module for the second service providing, to the management module, second operation data that specifies one or more second operations that the second service is configured to perform;

the management module receiving, from a second client, a request for a second operation that one of the multiple services is configured to perform;

in response to the management module receiving the request for the second operation, the management module determining, based upon the second operation data, whether the second service is configured to perform the second operation;

in response to the management module determining that the second service is configured to perform the second operation, the management module invoking the second function of the set of functions to provide, to the second service operation module, the request for the second operation; and in response to the second service operation module receiving the request for the second operation, the second service operation module sending the second operation to the second service.

2. The method of claim 1, wherein:
the second service is provided by a second network device that is different than the first network device.

3. The method of claim 1, further comprising:
discovering a new service provided by the first network device;
updating the first service operation module for the first network device to allow the client to request the new service via the first service operation module; and
providing, to the management module, from the first service operation module for the network device, new data that specifies one or more operations that the new service is configured to perform.

4. The method of claim 1, further comprising:
receiving an event notification;
based on a rule associated with the event notification, the management module sending, to the first service operation module for the first network device, an operation that corresponds to the rule and that is supported by a service hosted on the first network device; and
in response to receiving the operation from the management module, the first service operation module sending the operation to the first network device, wherein the first network device performs the operation.

5. A computer-implemented method for correlating network events and operations provided by network devices in a network, the method comprising:
generating a first service operation module for a first service provided by a first network device, wherein the first service operation module (a) supports a set of functions that are invokable by a management module and (b) acts as an interface between the management module and the first network device;

in response to the management module invoking, with respect to the first service operation module, a first function of the set of functions, the first service operation module for the first service providing, to the management module that is separate from the service operation module, operation data that specifies a set of one or more operations that the first service is configured to perform;

receiving event data that indicates a set of one or more network events that a second network device is configured to generate;

an event handler module receiving, from a user, a rule specifying an operation from the set of operations to be performed upon an occurrence of a network event from the set of network events;

in response to the event handler module receiving a notification of an occurrence of the network event from the second network device, determining whether to trigger the rule;

in response to determining to trigger the rule, the management module sending the operation to the first service operation module;

in response to receiving the operation from the management module, the first service operation module sending, to the first network device, the operation to be performed by the first service, wherein the first network device is either the same device as the second network device or a different device than the second network device;

generating a second service operation module for a second service provided by the second network device, wherein the second service operation module (a) supports the set of functions that are invokable by the management module and (b) acts as a second interface between the management module and the second network device; and the second service operation module for the second network device providing, to the management module, second operation data that specifies a set of one or more second operations that the second service is configured to perform.

6. A volatile or non-volatile computer-readable storage medium storing instructions for managing a network device, which instructions, when processed by one or more processors, cause:

generating a first service operation module for a first service provided by a first network device, wherein the first service operation module (a) supports a set of functions that are invokable by a management module and (b) acts as an interface between the management module and the first service provided by the first network device;

in response to the management module invoking, with respect to the first service operation module, a first function of the set of functions, the first service operation module for the first service providing, to the management module that is separate from the first service operation module, first operation data that specifies one or more first operations that the first service is configured to perform;

the management module receiving, from a client, a request for a first operation that one of the multiple services is configured to perform;

in response to the management module receiving the request from the client, the management module determining, based upon the first operation data, whether the first service is configured to perform the first operation specified in the request;

in response to the management module determining that the first service is configured to perform the first operation specified in the request, the management module invoking a second function of the set of functions to provide, to the first service operation module, the request for the first operation;

in response to the first service operation module receiving the request, the first service operation module sending the first operation to the first service;

discovering a second service that is different than the first service;

after discovering the second service:

generating a second service operation module for the second service, wherein the second service operation module is different than the first service operation module and is separate from the management module, wherein the second service operation module (c) supports the set of functions that are invokable by the management module and (d) acts as an interface between the management module and the second service, and registering the second service module with the management module;

in response to the management module invoking, with respect to the second service operation module, the first function of the set of functions, the second service operation module for the second service providing, to the management module, second operation data that specifies one or more second operations that the second service is configured to perform;

the management module receiving, from a second client, a request for a second operation that one of the multiple services is configured to perform;

in response to the management module receiving the request for the second operation, the management module determining, based upon the second operation data, whether the second service is configured to perform the second operation;

in response to the management module determining that the second service is configured to perform the second operation, the management module invoking the second function of the set of functions to provide, to the second service operation module, the request for the second operation; and in response to the second service operation module receiving the request for the second operation, the second service operation module sending the second operation to the second service.

7. The volatile or non-volatile computer-readable medium of claim 6, wherein:

the second service is provided by a second network device that is different than the first network device.

8. The volatile or non-volatile computer-readable storage medium of claim 6, wherein the instructions, when processed by the one or more processors, further cause:

discovering a new service provided by the first network device;

updating the first service operation module for the first network device to allow the client to request the new service via the first service operation module; and providing, to the management module, from the first service operation module for the network device, new data that specifies one or more operations associated with the new service.

9. The volatile or non-volatile computer-readable storage medium of claim 6, wherein the instructions, when processed by the one or more processors, further cause:

receiving an event notification;

based on a rule associated with the event notification, the management module sending, to the first service operation module for the first network device, an operation that corresponds to the rule and that is supported by a service hosted on the first network device; and in response to receiving the operation from the management module, the first service operation module sending the operation to the first network device, wherein the first network device performs the operation.

10. A volatile or non-volatile computer-readable storage medium storing instructions for correlating network events and operations provided by network devices in a network, which instructions, when processed by one or more processors, cause:

generating a first service operation module for a first service provided by a first network device, wherein the first service operation module (a) supports a set of functions that are invokable by a management module and (b) acts as an interface between the management module and the first network device;

in response to the management module invoking, with respect to the first service operation module, a first function of the set of functions, the first service operation module for the first service providing, to the management module that is separate from the service operation module, operation data that specifies a set of one or more operations that the first service is configured to perform;

receiving event data that indicates a set of one or more network events that a second network device is configured to generate;

an event handler module receiving, from a user, a rule specifying an operation from the set of operations to be performed upon an occurrence of a network event from the set of network events;

in response to the event handler module receiving a notification of an occurrence of the network event from the second network device, determining whether to trigger the rule;

in response to determining to trigger the rule, the management module sending the operation to the first service operation module;

in response to receiving the operation from the management module, the first service operation module sending, to the first network device, the operation to be performed by the first service, wherein the first network device is either the same device as the second network device or a different device than the second network device;

generating a second service operation module for a second service provided by the second network device, wherein the second service operation module (a) supports the set of functions that are invokable by the management module and (b) acts as a second interface between the management module and the second network device; and the second service operation module for the second network device providing, to the management module, second operation data that specifies a set of one or more second operations that the second service is configured to perform.

11. The method of claim 5, wherein the first network device is a different device than the second network device.

12. The method of claim 5, wherein:
the first network device is the same device as the second network device; and
the one or more operations that the first service is configured to perform are different than the one or more operations that the second service is configured to perform.

13. The volatile or non-volatile computer-readable storage medium of claim 10, wherein the first network device is a different device than the second network device.

14. The volatile or non-volatile computer-readable storage medium of claim 10, wherein:
the first network device is the same device as the second network device; and
the one or more operations that the first service is configured to perform are different than the one or more operations that the second service is configured to perform.

15. The method of claim 1, wherein the second service is provided by the first network device.

16. The volatile or non-volatile computer-readable storage medium of claim 6, wherein the second service is provided by the first network device.

* * * * *